July 14, 1925.
O. C. SCHROEDER
VALVE STRUCTURE
Filed March 21, 1924
1,546,032
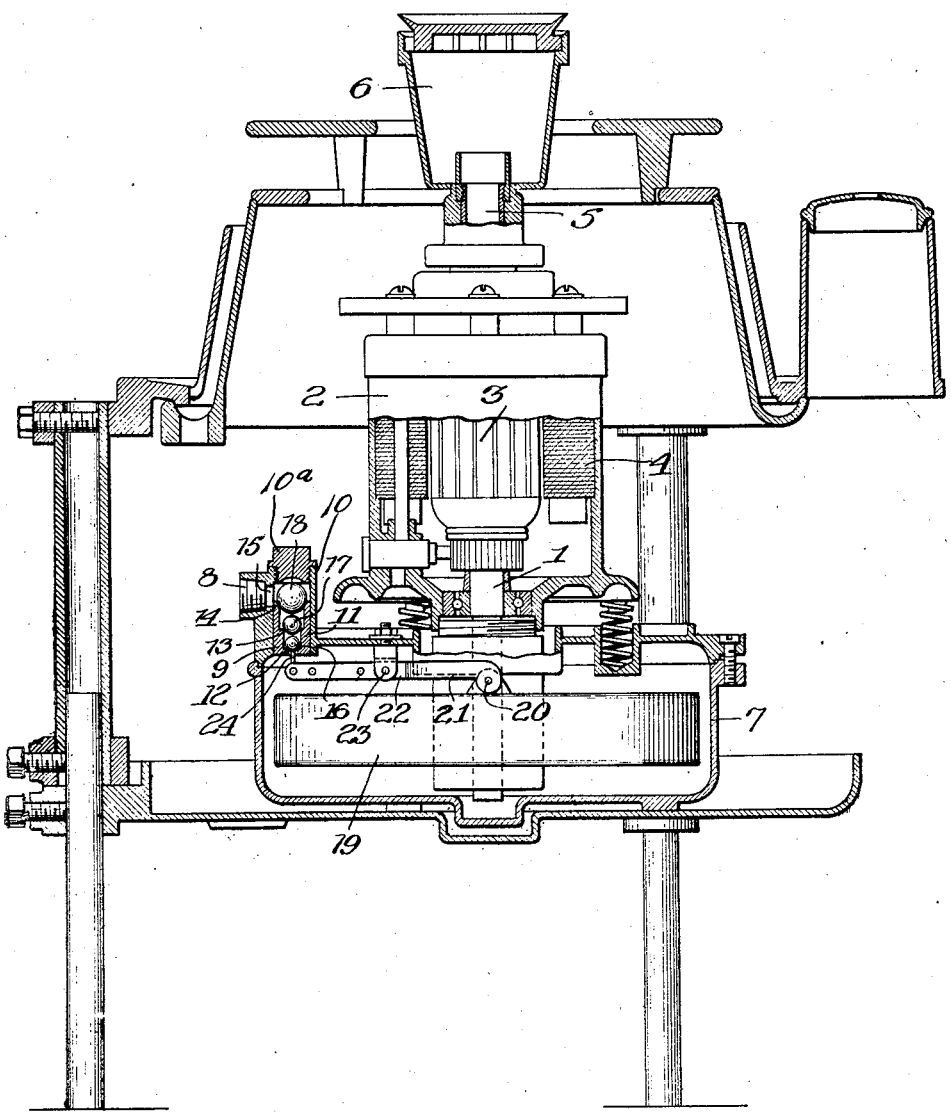
Inventor:
Oscar C. Schroeder, Patented July 14, 1925.

1,546,032

UNITED STATES PATENT OFFICE.

OSCAR C. SCHROEDER, OF CHICAGO, ILLINOIS.

VALVE STRUCTURE.

Application filed March 21, 1924. Serial No. 700,883.

*To all whom it may concern:*

Be it known that I, OSCAR C. SCHROEDER, a citizen of the United States, residing at Chicago, in the county of Cook and State of Illinois, have invented a new and useful Improvement in Valve Structures, of which the following is a specification.

My invention relates, generally stated, to check-valve structures for use, more particularly, in connection with fluids of such character, or in such condition, that there is a possibility of the valve not properly seating, the invention having been devised for use more particularly, though not to the exclusion of other uses thereof, in connection with fuel oil burners comprising as a portion of the course through which the oil flows from storage to the burner, a float-chamber, the intermittent flow of oil to which, is to be controlled.

My primary object is to provide a valve structure of a novel, simple and economical construction whereby danger of leakage of fluid through the valve, even when the fluid controlled thereby is of such character, or in such condition, as for example by containing solid bodies, that the valve will not properly seat, will be reduced to the minimum.

Referring to the accompanying drawing, the view therein shown represents my invention as applied to the inlet of the float-chamber of a fuel oil burner, the structure being shown in vertical sectional elevation, with a portion thereof in full elevation.

Referring first to the construction, in connection with which I have chosen to illustrate my invention, the construction shown is a fuel oil burner of a type comprising a rotatable, substantially vertically disposed, hollow shaft 1, shown as forming the armature shaft of a motor 2, the armature and field windings of which are represented at 3 and 4, respectively, the opening through the shaft, and represented at 5, extending from end to end thereof. The opening 5 at the extreme lower end of the shaft 1 is constricted, as compared with the opening at the extreme upper end thereof and which communicates with the burner proper 6 to be supplied with liquid fuel through the shaft 1, whereby rotation of the shaft causes oil supplied thereto to flow to the burner. The lower end of the shaft 1 opens into a receptacle 7, forming a float-chamber, in position therein to be continuously immersed in the liquid fuel supplied to this chamber through its inlet 8, under the control of a float-controlled valve structure embodying my invention and represented generally at 9.

The valve structure 9, according to the preferred embodiment of my invention, comprises a valve casing 10 containing a bushing 11 anchored therein in any suitable manner, the inner peripheral surface of which is shaped, as shown, to form valve chambers and the stepped annular shoulders 12, 13 and 14 forming valve-seats and arranged in a vertical series and of progressively larger diameters from the lowermost to the uppermost one. The casing 10 contains a port 15, through which the fluid supplied to the inlet 8 enters the casing above the uppermost valve-seat 14, the bushing 11 opening at its lower end, below the lowermost valve-seat 12, into the chamber 7. Co-operating with the valve-seats 12, 13 and 14 are ball-shaped valves 16, 17 and 18 which, when in engagement with the respective seats close the conduit, at these respective portions, to the flow of oil into the chamber 7. The valves 16, 17 and 18 are initially insertable from above through the upper end of casing 10 which is normally closed by a screw plug or closure 10* and said valves may be disposed at any desired distance apart, as for example, and by preference about $\frac{1}{64}$ or $\frac{1}{32}$ of an inch apart.

The unseating of the balls 16, 17 and 18, to permit of the flow of oil into the chamber 7, is effected by pushing upwardly on the ball 16 which, in moving upwardly in the casing, lifts the ball 17 from its seat, and in its further movement, with the ball 17, operates to unseat the ball 18, the latter, by its direct engagement therewith of the ball 17, it being understood that when upwardly directed force is relieved against the ball 16, the several balls will lower into engagement with their respective seats, assuming that the seats are free of anything, as for example, particles of solid matter which might have become lodged thereon and prevent any of the valves from properly seating. Should, however, any one, or even any two of the balls, in the particular construction shown, be prevented from properly seating, nevertheless the flow of oil into the chamber 7 will be prevented by reason of the proper seating of the remaining valve. While the valve structure is shown as comprising three independently seating valves, it will be readily understood that valves of a greater or less number, with a decreased, or increased, number of valve-seats, respectively, may be provided as conditions render it necessary or desirable.

In the particular construction shown, wherein it is desired that the several ball valves be unseated when the oil in the chamber 7 becomes reduced to a predetermined amount, the means for exerting upward force on the ball 16 to open the inlet 8 to the chamber 7, comprises a float 19 movable up and down in the chamber 7 and pivotally connected, as indicated at 20, to the yoke-shaped portion 21 of a lever 22 fulcrumed between its ends, as represented at 23, on a stud depending from the top of the chamber 7, the end of the lever 22 opposite that at which it is connected with the float 19 being pivotally connected with a pin 24 extending upwardly therefrom and preferably, though not necessarily, rigidly secured to the ball 16. Thus when the oil, which passes from the chamber 7 into the burner 6, lowers in this chamber to a certain point, the float 19 lowers with the result of unseating the ball 16 and in turn the balls 17 and 18, as hereinbefore described.

The provision of the valves 16, 17 and 18 as balls, is preferred, inasmuch as those of the valves which are free to rotate, may rotate thereby constantly presenting new surfaces for engaging the valve-seats with which they co-operate.

It will be manifest that even if the vertical spacing of the balls is such that a relatively great movement of the ball 16 is required to unseat all of the balls above it, in which case the flow of oil to the chamber 7 would be shut off before the float 19 has risen to a position in which the ball 16 seats, nevertheless the ball, or balls, as the case may be, which are located above the ball 16, become seated, and should it transpire that all of the balls above the ball 16 become prevented from seating, or should seepage past these valves occur, the ball 16, by the continued flow of the oil into the chamber 7, which would raise the float 19, would thereupon become seated, the direct connection of the ball 16 with the lever 22 operating to draw this ball firmly to its seat.

While I have illustrated and described a particular embodiment of my invention, I do not wish to be understood as intending to limit it thereto, as the same may be variously modified and altered without departing from the spirit of my invention.

What I claim as new, and desire to secure by Letters Patent, is:

1. In combination with a float chamber and float therein, a valve structure controlling the inlet of said chamber, said structure having a casing, said casing being interiorly stepped to provide a plurality of communicating valve chambers therein decreasing in size progressively in a downward direction and seats at the outlets of said chambers, valves normally engaging said seats initially insertable to their respective chambers and seats from above the same and in the same substantially straight line, means to control the lowermost valve through the movement of the float, the remainder of said valves each being arranged for unseating through engagement therewith of the valve next below the same.

2. In combination with a float chamber and float therein, a valve structure controlling the inlet of said chamber, said valve structure comprising a casing extending from said chamber, a bushing within said casing, said bushing being interiorly stepped to provide a plurality of communicating valve chambers decreasing in size progressively in a downward direction and seats at the outlets of said chambers, ball valves normally engaging said seats and initially insertable to their respective chambers and seats from above the same and in the same substantially straight line, means to control the lowermost ball valve through the movement of the float, the remainder of said ball valves each being arranged for unseating by engagement therewith of the valve next below the same.

OSCAR C. SCHROEDER.